United States Patent [19]

Pickart et al.

[11] 4,299,888
[45] Nov. 10, 1981

[54] METHOD FOR FORMING IN SITU MAGNETIC MEDIA IN THE FORM OF DISCRETE PARTICLES AND ARTICLE

[75] Inventors: Don E. Pickart, San Jose, Calif.; Philip W. Reed, Tucson, Ariz.; Joseph S. Vranka, Boulder, Colo.

[73] Assignee: IBM Corporation, Armonk, N.Y.

[21] Appl. No.: 143,064

[22] Filed: Apr. 23, 1980

[51] Int. Cl.$^3$ ............................................. B32B 15/04
[52] U.S. Cl. ..................................... 428/457; 427/35; 427/36; 427/48; 427/55; 427/128; 427/129; 427/132; 427/261; 428/694; 428/900
[58] Field of Search ............ 427/35, 36, 48, 127–132, 427/55, 261; 428/900, 694, 457

[56] References Cited

U.S. PATENT DOCUMENTS 3,772,078 11/1973 Polichette ........................... 116/212
4,059,463 11/1977 Aonuma et al. .................... 148/105

OTHER PUBLICATIONS

NASA Tech. Brief, 12–72, B 72–10456 Radiation Induced Nickel Deposits.

*Primary Examiner*—Bernard D. Pianalto
*Attorney, Agent, or Firm*—O'Rourke & Harris

[57] ABSTRACT

A method of forming discrete magnetic particles in situ by dispersing a nickel hypophosphite solution in a binder and binder solvent, such as polyvinyl alcohol in water or polyester urethane polymer in an organic solvent, forming a coating from the nickel hypophosphite binder solution on a substrate, and exposing the coating to a radiant energy source, such as x-rays or an electron beam. Thereafter the incipient magnetic media in the area exposed to radiation is developed by contact with a solution including ions of at least one of cobalt, nickel and iron and a reducing agent, such as a hypophosphite ion, to produce a magnetic media of discrete magnetic particles within the binder in the area exposed to the radiant energy while not forming such magnetic particles in other unexposed areas of the nickel hypophosphite coating.

18 Claims, No Drawings

METHOD FOR FORMING IN SITU MAGNETIC MEDIA IN THE FORM OF DISCRETE PARTICLES AND ARTICLE

BACKGROUND OF THE INVENTION

1. Field of the Invention

This invention relates in general to in situ formation of magnetic media subsequent to coating, and in particular to formation in situ of discrete magnetic particles from a coating including nickel and hypophosphite functioning as sensitizing agents, by exposure to radiant energy, and particularly x-rays and electron beam radiation sufficient to form nickel nuclei in the coating, and developing the exposed areas with a reducing agent, such as sodium hypophosphite, in solution with cobalt, nickel and/or iron ions.

2. Description of the Related Art

Electroless deposition of metals under reducing conditions has been known for various purposes. The resulting coating may be in the form of a continuous metal layer, i.e. plating, or may be deposited image-wise by, for instance, exposure to x-ray radiation in a photographic process.

U.S. Pat. No. 3,762,938 discloses a reducing process for depositing metal coatings on substrates. U.S. Pat. Nos. 3,378,410 and 3,658,569 disclose methods for image-wise production of metallic coatings utilizing an electron beam as a photographic or graphics art production method. Similarly, U.S. Pat. No. 3,920,485 discloses the use of an electron beam to form platelets of a metallic substance for utilization in thin film technology to produce electronic circuitry devices.

U.S. Pat. Nos. 3,607,218, 3,726,664 and 4,059,463 disclose procedures for producing fine magnetic particles by reducing from solution magnetic metal salts by, for instance, exposure to hypophosphite ions. However, the purpose of these patents is the production of the particles per se, which are thereafter conventionally milled with binders to produce coatings to form magnetic media, such as tapes and disks.

Thus, in summary, the related art is concerned with reduction of metallic salts to form reduced metal plating and images without significant magnetic properties, or, alternatively, to form particles adapted to be included in an admixture with a binder for production of discrete magnetic particles in a layer. The latter process, which is often accomplished by extensive ball milling of the magnetic particles with a binder, results in degradation and breaking of the magnetic particles through forceful physical processes such as ball milling, extrusion coating, calendering, etc.

SUMMARY OF THE INVENTION

The present invention, which provides a heretofore unavailable improvement in magnetic media formation, comprises a method in which nickel in the presence of hypophosphite is dispersed in a solution, either aqueous or organic based, of a binder and coated onto a substrate. Thereafter the coated substrate, after removal of the solvent, is exposed either in its entirety or in selected portions, to radiant energy such as x-rays or electron beam. Discrete particles of magnetic media may be developed in the exposed areas by applying a developing solution including cobalt, nickel and/or iron and a reducing agent such as hypophosphite ions to the exposed areas of the coating. Examination indicates that the magnetic media thus formed is of discrete substantially spherical particles of magnetic metal dispersed uniformly within the binder matrix.

Various advantages accrue from the method of the instant invention. Since the magnetic particles are formed subsequent to the coating and dispersing steps, the rather harsh physical forces associated with dispersion, coating, calendering, etc. are not imposed upon the particles with resulting fracturing, clumping, etc. Also, the irradiation of the coating may be accomplished only at selected portions of the coating to provide tracks, patterns, and other desirable arrangements of magnetic and nonmagnetic areas.

DETAILED DISCUSSION OF THE INVENTION

Coatings, according to the method of the instant invention, may employ various binder polymers, either soluble in aqueous solutions or organic solvents. For instance, gelatins, polyvinyl alcohol and other similar water soluble polymers may be employed as the binder matrix. In the event an aqueous solution is employed, the solution must be maintained in a basic condition, preferably by the addition of an appropriate amount of ammonium hydroxide. Various binders soluble in organic solvents such as polycarbonate resins, polyester resins, acrylic resins, polyester urethane resins and similar polymers may be utilized in conjunction with organic solvents. Solvents systems may be single component or multiple component, but preferably tetrahydrofuran and/or methyl isobutyl ketone are employed. Toluene and other such organic solvents are of course workable.

While the transition metal elements, i.e. cobalt, nickel and iron are typically employed as magnetic compositions, it has been found that only nickel in conjunction with hypophosphite ions satisfactory serves as a sensitizing agent in the composition of the instant invention.

Concentration of the nickel sensitizing agent is not particularly critical, but sufficient amounts should be included in the coating to provide a rich supply of nucleating sites to provide substantial densities of magnetic particles when developed.

The substrates upon which the magnetic particles of the instant invention may be produced also are not critical, though of course a ferromagnetic material would not be employed. Typically flexible substrates are of dimensionally stable polyethylene terephthalate film, while rigid substrates are conveniently of aluminum.

The basic requirements of the developing bath are the inclusion of a transitional metal, i.e., cobalt, nickel or iron, or mixtures thereof, in a solution also providing a reducing ion, such as hypophosphite, but operably of other known reducing materials such as sodium borohydride or dimethylamine borane. Aqueous solutions of sodium hypophosphite in the presence of ammonium hydroxide and sodium citrate, which functions as a stabilizer, are preferred.

Preferably the initial coating is irradiated with relatively high energy radiation, and preferably x-rays or an electron beam. Exposure intensities and durations are dependent upon the coating, but, since overexposure is not a concern, it is a simple matter to increase the intensity and or duration of the radiant energy if insufficient reduction of the nickel sensitizing agent is observed in a specific instance. When testing for operability, prolonged exposure periods are suggested.

The nature of the invention will be more readily understood with reference to the following examples.

EXAMPLE 1

A coated support having magnetic particles thereon was prepared in accord with the instant invention by first dissolving 1 gram of polyvinyl alcohol (Elvanol 72-60 manufactured by DuPont) in 9 grams of water in a 50 milliliter beaker. After stirring and heating, the polyvinyl alcohol completely dissolved in the water. Ten grams of nickel hypophosphite ($NiH_2PO_2.6H_2O$) and 18 milliliters of concentrated ammonium hydroxide were stirred together until dissolution was complete, and the resulting solution was added to the polyvinyl alcohol solution with stirring. A 4 inch wide, three foot long polyethylene terephthalate film substrate was coated with the nickel hypophosphite solution with the coating being accomplished by spreading with a doctor blade and air drying. A particular portion of the film was irradiated with a 65 kilovolt x-ray source for 2 hours, and then exposed to a developing solution after first being exposed to the fumes of ammonium hydroxide for 5 minutes. The developing solution included 5.9 grams of cobalt (II) chloride and 5.3 grams sodium hypophosphite in 250 milliliters of water. Thirty grams of concentrated ammonium hydroxide was added to the developing solution. The developing solution formed a precipitate. When the irradiation coated film was immersed in the developer solution, a reaction appeared to occur and gas was evolved. The film turned black at the irradiated portion while the non-irradiated portions did not undergo any reaction and did not turn black. After again drying, the sample was tested for magnetic properties in a vibrating sample magnetometer with a 4000 gauss maximum field. The sample was found to have a coercivity of 558 oersteds. Examination under an electron microscope at approximately 353,000X magnification indicated that the magnetic particles were in the form of spheroids having diameters in the range of 50 to 200 angstrom units. It was surmised that the cobalt of the developing solution deposited in the areas in which small amounts of nickel sensitizing agent were reduced by the irradiation in the presence of a hypophosphite ion.

EXAMPLE 2

A film substantially as described in Example 1 was produced but utilized only one quarter the amount of nickel hypophosphite in the coating. After irradiation with a 65 kilovolt x-ray source for one hour, the film was developed in a bath similar to that of Example 1, but with 50% more ammonium hydroxide. After developing the film for 30 minutes in the developing solution with the film placed between the poles of a permanent magnet of 1000 gauss field strength and with the magnetic lines of force parallel to the plane of the film, the film was dried and tested. Symetric magnetic properties were observed. A maximum coercivity of 309 oersteds was noted, with an orientation ratio of 1.34 indicating a pronounced orientation of the magnetic particles.

EXAMPLE 3

A film was prepared as set forth in Example 1 except that the doctor blade was supported 7 mils above the substrate thereby producing a dry coating of 400 microinches. After exposure to a 65 kilovolt x-ray source for 2 hours, the film was immersed in the developing bath for 5 minutes. The developing bath included sodium citrate as a stabilizer to minimize the precipitation noted in the developing bath of Example 1, and more specifically included 8.6 grams of cobaltous sulfate, 8.6 grams of sodium citrate, 5.0 grams of sodium hypophosphite dissolved in water and adjusted to 200 milliliters volume. Thereafter 25 milliliters of concentrated ammonium hydroxide was added. After development, the film was tested and found to have a coercivity of 216 oersteds.

EXAMPLE 4

The procedure of Example 3 was repeated with the exception that a 2 hour development time was employed. The resulting film in the irradiated areas was very smooth and gave the appearance of being plated. Coercivity was tested at 353 oersteds. However, the coating displayed poor adhesion to the substrate.

EXAMPLE 5

The procedure of Example 3 was repeated with the exception that 8.5 grams of ferrous sulfate was used in the bath instead of the cobalt sulfate. After development, the resulting dried film had a coercivity of 40 oersteds. Thus iron proved operable but provided magnetic characteristics different from the cobalt examples.

EXAMPLE 6

A coating solution in accord with the instant invention was prepared utilizing a polyester urethane polymer (Estane 5702 manufactured by B. F. Goodrich Co.) dissolved in tetrahydrofuran and methyl isobutyl ketone. 7 grams of the polyester urethane polymer and 70 grams tetrahydrofuran was added to a solution of nickel hypophosphite and 30 grams of tetrahydrofuran which had been ball milled for 10 minutes. After 15 minutes additional milling, 40 grams of methyl isobutyl ketone were added and the milling continued for another hour. The resulting dispersion was cast on a polyethylene teraphthalate substrate and formed into a smooth film utilizing a doctor blade to form a coating 5 mils thick when dried. After 7.5 hours exposure to a 65 kilovolt x-ray source and development in the bath of Example 3 by immersion for 5 minutes, the resulting dried coating was determined to have a coercivity of 340 oersteds.

EXAMPLE 7

The procedure of Example 6 was repeated utilizing only 33 grams of nickel hypophosphite and 50 kilovolts of irradiation for 9.2 hours. The developed sample was determined to have a coercivity of 413 oersteds.

EXAMPLE 8

A coating solution was prepared by dissolving 7 grams of polyester urethane polymer in 100 grams of tetrahydrofuran and 40 grams of methyl isobutyl ketone. 33 grams of nickel hypophosphite and 200 grams of ⅛ diameter balls were added and the entire despersion agitated for 30 minutes on a paint shaker. The resulting dispersion was coated on a polyethylene terephthalate substrate utilizing a doctor blade to form a coating, which when dried, was 1 mil thick. A sample of the coating was placed in a scanning electron microscope after conductive silver paint was applied to the non-coated side. Utilizing operating conditions of 80 x magnification, 1 micrometer spot size, 50 K voltage, 84 microamperes beam current, an area of 1500 micrometers by 1200 micrometers was exposed for 10 minutes. Examination of the exposed area indicated a darkening showing that sensitization of the nickel had taken place. A drop of the developer of Example 3 was applied to the sensitized area whereupon the exposed area turned black and hydrogen bubbles were evolved when observed under an optical microscope at 30x magnification. Though the sample size precluded magnetic measurements, the physical indications strongly suggested that cobalt particles were formed at the sensitized area.

EXAMPLE 9

Two coating solutions were prepared, one being the nickel solution of Example 8 and the other being that the Example 8 with the nickel hypophosphite replaced by cobalt hypophosphite. Four mixtures were formed from the two solutions as follows:

|   | % Nickel Solution | % Cobalt Solution |
|---|---|---|
| A | 100 | 0 |
| B | 75 | 25 |
| C | 50 | 50 |
| D | 25 | 75 |

The resulting solutions were each coated on separate pieces of polyethylene terephthalate substrate utilizing a number 60 wire wound rod to form 0.6 mil thick dried coatings. These were irradiated for 30 minutes in scanning electron microscope utilizing the following conditions:

| magnification | 160 × |
| sweep time | 32 seconds |
| current | 84 microamperes |
| voltage | 50K volts |
| irradiated area size | 1 mm × 0.75 mm |
| lines | 1000 |

All samples darkened somewhat by the irradiation, but the higher nickel sample tended to darken more. Upon treatment of each sample with a drop of the development of Example 3, the samples were observed under a 30x optical microscope to determine which samples dveloped in a manner comparable to that of Example 8. Samples A and B developed, but Samples C and D did not. Thus, with decreasing nickel in the coating solution, sensitivity of the resulting coated film diminished.

EXAMPLE 10

A coat solution was prepared utilizing 2.5 grams of nickel chloride, 2.5 grams of sodium hypophosphite, 1 grams of polyvinyl alcohol, 9 grams of water and 1 milliliter of concentrated ammonium hydroxide. The solution was in effect divided in half and 18.5 milliliters of concentrated ammonium hydroxide was added to one of the portions. Both solutions were coated onto polyethylene terephthalate substrates and irradiated with 50 kilovolts of x-rays for 5 hours. After development in the bath of Example 3, the coercivity of the film produced from the original solution was measured at 490 oersteds while that with additional ammonium hydroxide was measured at 436 oersteds.

EXAMPLE 11

A coating solution of 1 gram of polyvinyl alcohol, 9 grams of water, 10 grams sodium hypophosphite and 18 milliliters of ammonium hydroxide was coated onto a substrate and exposed to a 50 kilovolt x-ray source for, at a first area $\frac{1}{2}$ hour, and at a second area for 2 hours.

A developer of 8.6 grams nickel chloride, 8.6 grams sodium citrate, 5 grams ammonium hypophosphite, and 25 milliliters of ammonium hydroxide added to 200 milliliters of the basic solution was utilized to develop the film by immersion for 5 minutes. The film irradiated for $\frac{1}{2}$ hour displayed 9 oersteds, while that irradiated for 2 hours displayed 19 oersteds. Thus some magnetic coercivity was afforded with nickel developing solutions but this results is substantially less than that of the nickel sensitizing agent in conjunction with cobalt developing solutions.

EXAMPLE 12

A coating solution such as described in Example 11 was utilized to provide samples of coated substrate. Four developing baths were prepared as follows:

A. 8.6 gm. $FeSO_4$, 8.6 gm. sodium citrate, and 5.0 gm. sodium hypophosphite
B. 4.3 gm. $FeSo_4$, 4.3 gm. $CoCl_2$, 8.6 gm sodium citrate and 5.0 gm. sodium hypophosphite
C. 1.07 gm. $FeSO_4$, 1.07 gm. $CoCl_2$, 2.15 gm. sodium citrate and 1.25 gm. sodium hypophosphite
D. 8.6 gm. $FeSO_4$, 8.6 gm. $CoCl_2$, 17.2 gm. sodium citrate and 10.0 gm. sodium hypophosphite All developing baths were prepared by dissolving the salts in water, adding 25 milliliters of concentrated ammonium hydroide and adjusting the total volume to 250 milliliters. The coated film was irradiated for 2 hours with 65 kilovolts of x-rays and samples of the irradiated film were developed in each of the four baths for 5 minutes except that development in bath C was for 10 minutes. The magnetic properties of the developed films were tested with the following results:

Development bath A 212 oersteds
Development bath B 210 oersteds
Development bath C 209 oersteds
Development bath D 216 oersteds.

Thus the nature of the cobalt added to the baths and the concentrations are not particularly critical to the resulting magnetic media.

A number of typical coating solutions utilizing polyvinyl alcohol and various or no reducing agents were prepared. Specifically, iron and sodium hypophosphite, tin and sodium hypophosphite, silver and sodium hypophosphite, silver with no reducing agent, palladium with no reducing agent, palladium with sodium hypophosphite, cobalt with sodium hypophosphite, cobalt with sodium borohyride, cobalt with dimethylamine borane, and copper with sodium hypophosphate were prepared and tested. None of the combinations yielded satisfactory results, i.e. development after sensitizing. Thus only nickel has been found to be satisfactory as a sensitizing agent for in situ production of magnetic particles in accord with the instant invention.

In summary, it has been found that nickel in the presence of a reducing agent, and specifically a hypophosphite ion, may be coated in either organic solvent soluble binders or water soluble binders, to form a film on a substrate, irradiated, and developed with developing bath including a metal such as nickel, iron or cobalt, in the presence of a reducing ion such as the hypophosphite ion. In this manner, magnetic particles may be formed after the harsh physical forces of the dispersion and coating processes are completed. If desired, the development may take place in the presence of a magnetic field to orient the particles, and/or the irradiation may be imagewise to provide magnetic particles in only selected portions of the nickel containing coating. Thus desirable coatings containing magentic particles and functional or various purposes.

Although in view of the wide usage to which the present invention can be used, only limited embodiments of the invention have been described for purposes of illustration, it is, however, anticipated that various changes and modifications will be apparent to those skilled in the art, and that changes and modifications may be made without departing from the scope of the invention as defined by the following claims.

We claim:

1. A method of forming discrete magnetic particles in situ within a binder matrix comprising:
   dispersing with a binder and solvent for the binder a nickel hyposphosphite solution,
   forming a layer of the nickel hyposphosphite solution by removing the binder solvent therefrom,
   exposing at least a portion of the layer to a radiant energy source, and
   developing the magnetic particles by contacting the exposed layer with a developing solution including a ferromagnetic metal ion, and a reducing agent, whereby discrete magnetic particles are produced in the binder matrix.

2. A method of forming discrete magnetic particles as set forth in claim 1 in which the binder is a water soluble compound.

3. A method of forming discrete magnetic particles as set forth in claim 2 in which the water soluble polymer is selected from the group consisting of gelatin and polyvinyl alcohol.

4. A method of forming discrete magnetic particles as set forth in claim 1 in which the binder is soluble in organic solvents.

5. A method of forming discrete magnetic particles as set forth in claim 4 in which the binder is selected from the group consisting of polycarbonate resins, polyester resins, acrylic resins, and polyester urethane resins.

6. A method of forming discrete magnetic particles as set forth in claim 5 in which the binder is dissolved in an organic solvent selected from the group consisting of tetrahydrofuran, methyl isobutyl ketone and toluene.

7. A method of forming discrete magnetic particles as set forth in claim 1 in which the radiant energy is x-rays or an electron beam.

8. A method of forming discrete magnetic particles as set forth in claim 1 in which the ferromagnetic metal ion included in the developing bath includes at least one metal ion selected from the group consisting of cobalt, nickel and iron ions.

9. A method of forming discrete magnetic particles as set forth in claim 1 in which the reducing agent in the developing bath is selected from the group consisting of sodium borohydride, dimethylamine borane, and sodium hypophosphite.

10. A method of forming discrete magnetic particles as set forth in claim 1 in which the layer of nickel hypophosphite solution is formed into a layer on a substrate.

11. A method of forming discrete magnetic particles as set forth in claim 10 in which the substrate is selected from the group consisting of polyethylene terephthalate and alumminium.

12. A layer of discrete magnetic particles dispersing in a binder matrix formed in situ as described in the method of claim 1.

13. A method of forming a layer of discrete magnetic particles and a binder matrix with the particles being formed in situ within the binder matrix, the method comprising:
    dispersing a nickel hypophosphite solution, a binder, and a liquid solvent to form a coating solution,
    applying the coating solution to a substrate,
    forming a layer of the nickel hypophosphite solution and binder by removing the liquid therefrom,
    reducing nickel metal nuclei at at least a portion of the layer by exposing the layer to a radiant energy source, and
    forming individual, discrete magnetic particles at the nickel sensitizing nuclei by contacting the layer containing the nickel nuclei with a developing solution including a ferromagnetic metal ion and a reducing agent, whereby the discrete magnetic particles are produced in the matrix at the nickel sensitizing nuclei by reduction of the ferromagnetic metal ions to magnetic particles.

14. A method of forming discrete magnetic particles within a binder as set forth in claim 13 in which the binder is selected from the group consisting of gelatin, polyvinyl alcohol, polycarbonate resins, polyester resins, acrylic resins, and polyester urethane resins.

15. A method of forming discrete magnetic particles within a binder as set forth in claim 13 in which the magnetic particles are substantially spheroidal in shape and having dimensions along orthogonal axis within the range of about 50 angstrom units to 200 angstrom units.

16. A method of forming discrete magnetic particles in a binder as set forth in claim 13 in which the radiant energy is x-rays or an electron beam.

17. A method of forming discrete magnetic particles in a binder as set forth in claim 13 in which the ferromagnetic metal ion included in the developing bath includes at least one metal ion selected from the group consisting of cobalt, nickel and iron ions.

18. A method of forming discrete magnetic particles as set forth in claim 13 in which the reducing agent in the developing bath includes a hyposphosphite ion.

* * * * *